(12) United States Patent
Matsuba et al.

(10) Patent No.: US 7,017,006 B2
(45) Date of Patent: Mar. 21, 2006

(54) SYSTEM AND METHOD TO ENABLE EFFICIENT COMMUNICATION WITH A DYNAMIC INFORMATION STORAGE AND RETRIEVAL SYSTEM, OR THE LIKE

(75) Inventors: Yasutomo Matsuba, Ibaraki (JP); Satoru Yamauchi, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 215 days.

(21) Appl. No.: 10/249,646

(22) Filed: Apr. 28, 2003

(65) Prior Publication Data

US 2004/0215875 A1 Oct. 28, 2004

(51) Int. Cl.
*G06F 12/00* (2006.01)

(52) U.S. Cl. .................. 711/113; 711/167; 711/170
(58) Field of Classification Search ............ 711/113, 711/118, 135, 167, 170–172
See application file for complete search history.

(56) References Cited

U.S. PATENT DOCUMENTS

| 4,084,234 | A | * | 4/1978 | Calle et al. ............... 711/118 |
| 5,235,690 | A | * | 8/1993 | Beardsley et al. ......... 711/113 |
| 5,257,352 | A | * | 10/1993 | Yamamoto et al. ........ 711/136 |
| 5,946,708 | A |   | 8/1999 | Fang et al. ................ 711/113 |
| 6,233,653 | B1 | * | 5/2001 | Abe et al. .................. 711/113 |
| 6,408,357 | B1 | * | 6/2002 | Hanmann et al. ......... 711/113 |

\* cited by examiner

*Primary Examiner*—Matthew D. Anderson
(74) *Attorney, Agent, or Firm*—W. Daniel Swayze, Jr.; W. James Brady; Frederick J. Telecky, Jr.

(57) ABSTRACT

An information storage and retrieval system (40) and method for operating same has a host device (42) and an information storage device (41), which includes mass data storage means (54), such as a DVD, a DVD RAM, CD-ROM, alone, or in combination. The information storage device (41) includes a cache memory (48) for holding data as it is being written to the mass data storage means (54). The host device (42) is connected to the cache memory (48) to control a size of the cache memory that can be utilized to hold the data to be written to the mass data storage means (54), to control, for instance, the flush, seek, busy, and/or overhead times of the information storage device (41).

2 Claims, 2 Drawing Sheets

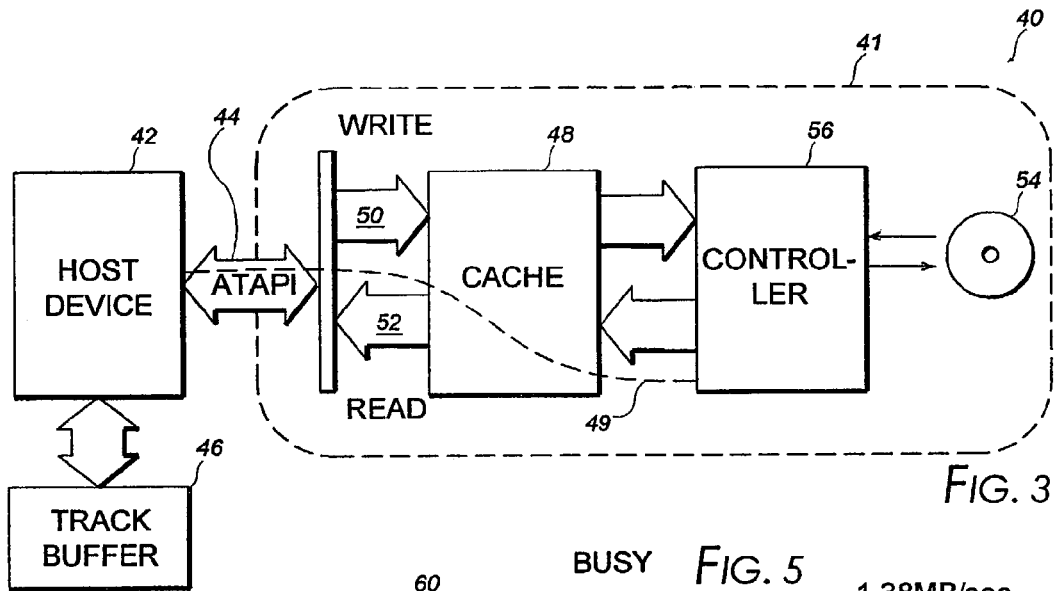
FIG. 3
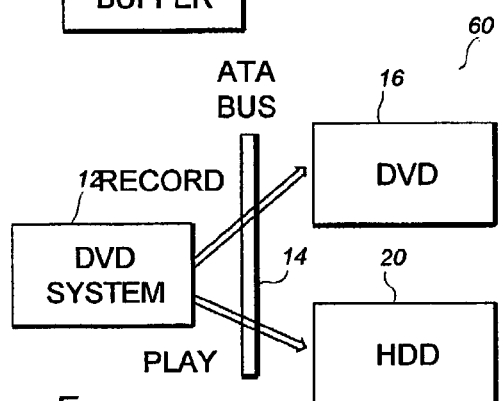
FIG. 4
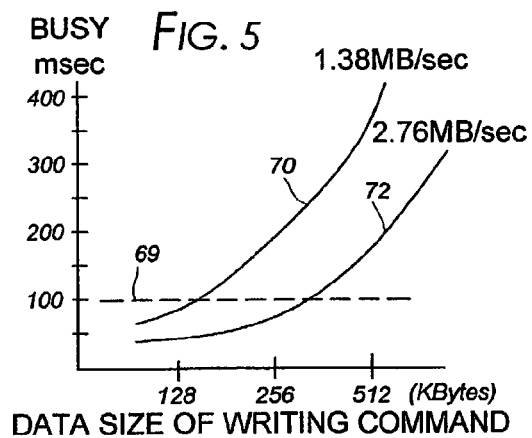
FIG. 5
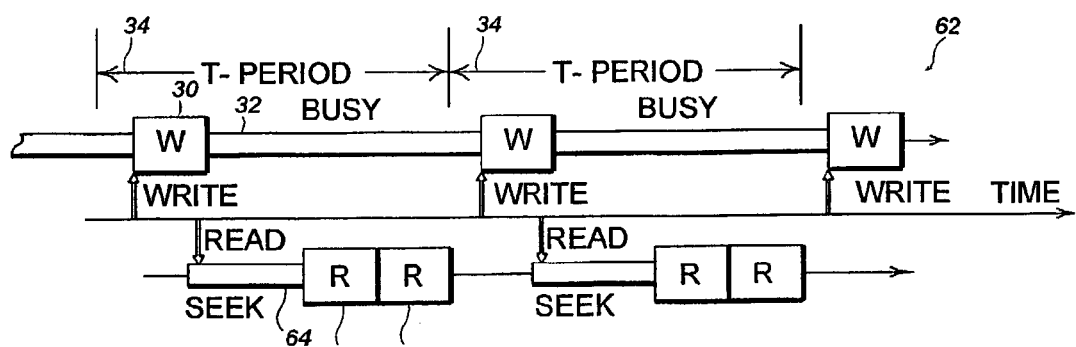

SYSTEM AND METHOD TO ENABLE EFFICIENT COMMUNICATION WITH A DYNAMIC INFORMATION STORAGE AND RETRIEVAL SYSTEM, OR THE LIKE

BACKGROUND OF INVENTION

1. Field of Invention

This invention relates to improvements in methods and apparatuses for dynamic information storage and retrieval, and more particularly to improvements in dynamic information storage systems of the type having associated mass data storage devices, such as DVDs, CD-ROMs, or like devices, and still more particularly to improvements in methods for managing, allocating, or controlling a cache memory in such dynamic information storage and retrieval systems depending upon the specifications of mass data storage devices associated therewith, and systems for using same.

2. Relevant Background

As used herein, the term "dynamic information storage system" includes digital systems that have one or more mass data storage devices to which digital data may be selectively written and read back. Some dynamic information storage systems, for example, may include one or more digital video disk (DVD) devices alone, or in combination with one or more compact disk read-only memory (CD-ROM) devices. The data storage devices may be interfaced to a system bus, a typical bus that is currently popular in use being, for example, the ATAPI bus, although other buses can be used.

Mass data storage devices include tape drives, RAM drives, as well as hard disk drives that have one or more spinning magnetic disks or platters onto which data is recorded for storage and subsequent retrieval. Hard disk drives may be used in many applications, including personal computers, set top boxes, video and television applications, audio applications, or some mix thereof. Applications for hard disk drives are still being developed, and are expected to further increase in the future. Mass data storage devices may also include optical disks in which the optical properties of a spinning disk are locally varied to provide a reflectivity gradient that can be written and detected by laser transducer heads, or the like. Optical disks may be used, for example, to contain data, video signals, music, or other information.

In dynamic information storage systems, typically a host device or system may be required to interface to the system, yet, as mentioned, a single dynamic information storage system may include either a DVD type, CD-ROM type, or both types of mass data storage devices. Such devices are now being provided, for example, in systems in which both audio and video data can be written to the respective mass data storage devices associated with the system. This can create a problem in that relatively long times are required in order to fully record data to DVD systems, especially in comparison to the relatively shorter time that is required to write audio data to a CD-ROM mass data storage device. Because the wait times of different types of mass data storage devices may differ, the efficiency of the system may not be optimal for a particular host.

Typically, in the construction of dynamic information storage systems, the communication between a host and the associated mass data drive(s) should be taken into consideration. If, for example, a DVD drive is included, the system would typically have a long busy time during communication, because DVD drives have a slow response. This factor restricts the freedom of the structure of the host. For example, in order to accommodate the long busy time, the host needs a large memory as a communication buffer. This makes the system larger and more complex than otherwise would be required if the busy time were not so long.

In the design of DVD drives, and particularly in the combination of a DVD drive with a host device, typically trade-offs need to be made. For example, some DVD drives have different busy and overhead times, but, nevertheless have the same DVD writing speed.

In some applications, a small overhead time may be better in a system in which the data transfer frequently changes direction, for example, in a read/write operation. On the other hand, in other installations, a small busy time may be better in a system in which the host performs a number of write operations to the DVD device in frequent succession. As will be seen in the detailed description below, the overhead and busy times depend upon the size of the cache.

In the past, however, the size of the cache could not be changed in the design the system. Therefore, depending upon the particular application, it has been important to select the proper drive to meet the particular needs of the application. For example, a drive having a small overhead time may be selected in those applications which have frequent changes in the data direction. Moreover, once the drive is selected to meet the particular application needs, the host device needs to be selected to adapt to the particular drive that is selected.

This difficulty is further compounded when a system is designed in which several applications may be combined into a single device, and, in particular, in cases in which some applications require a short overhead and other applications require a short busy time. In the past, the design of a host in such cases was a trade-off considering the unchangeable characteristics of the drives.

What is needed, therefore, is a method and system that provides efficient communication between a host and its associated data storage systems, regardless of the construction of the dynamic information storage systems with regard to the types of mass data storage devices associated therewith.

SUMMARY OF INVENTION

One advantage of the present invention is that it provides a method to reduce the effects of long busy times during data write actions in some data storage systems. Long busy times are prevalent in many data storage systems, or the like, particularly when the data storage system includes different types of mass data storage devices that have different write speeds.

It is another advantage of the invention is that the host of a dynamic information storage and retrieval system is enabled to control the flush, seek, busy, and/or overhead times in an information storage and retrieval system.

According to a broad aspect of the invention, an information storage and retrieval system is presented that has an information storage device and a host device. The information storage device includes a cache memory for holding data as it is being written to the information storage device. The host device is connected to the cache memory to control a size of the cache memory that can be utilized to hold the data. The information storage device may include, for example, a DVD, a DVD RAM, CD-ROM, alone or in combination.

According to another broad aspect of the invention, an information storage and retrieval system is presented that has an information storage device and a host device. The information storage device includes a cache memory for holding data as it is being written to the information storage device. The host device is connected to the information storage system to control a flush time thereof.

According to yet another broad aspect of the invention, an information storage and retrieval system is presented that has an information storage device and a host device. The information storage device includes a cache memory for holding data as it is being written to the information storage device. The host device is connected to the information storage system to control an overhead time thereof.

According to yet another broad aspect of the invention, an information storage and retrieval system is presented that has an information storage device and a host device. The information storage device includes a cache memory for holding data as it is being written to the information storage device. The host device is connected to the information storage system to control a busy time thereof.

According to still another broad aspect of the invention, a data storage system is presented. The data storage system includes a host device for delivering data to be written to the data storage system. The data storage system also includes a system bus, at least one mass data storage device connected to the system bus, a cache memory, and a controller to control the cache memory. The controller is connected to allocate an amount of the cache memory to receive the data to be written to the data storage system. The host device is configured to control the controller to allocate an amount of the cache memory to receive the data to be written to the data storage system according to a specification of the at least one mass data storage device connected to the system bus.

The system bus may be, for example, an ATAPI bus. The host device may be connected to effectively control an overhead time, a busy time, a seek time, or a flush time by controlling a write and read allocation of the cache memory.

According to still yet another broad aspect of the invention, a data storage system is presented of the type having at least one mass data storage device associated therewith. The data storage system includes a data bus and a cache memory connected to the data bus to receive data from a data source to be written to the data storage system. Means are also provided for allocating the cache memory depending upon a specification of the at least one mass data storage device.

According to yet still another broad aspect of the invention, a method is presented for determining a cache size used in an information storage and retrieval system of the type having a host device interfaced to at least one mass data storage device by a bus. The method includes determining an overhead time required by the host device and determining the cache size by multiplying a writing speed of the mass data storage device by the difference between an overhead time and a seek time.

According to still another broad aspect of the invention, a method is presented for determining a cache size used in an information storage and retrieval system of the type having a host device interfaced to at least one mass data storage device by a bus. The method includes determining a busy time required by the host device and determining the cache size by multiplying the busy time by a sum of a writing speed of the mass data storage device and a speed of the bus.

According to another broad aspect of the invention, a method is presented for operating a data storage system that includes a memory cache. The method includes determining a specification of at least one mass data storage device within the data storage system and allocating an amount of the cache memory for writing data to the data storage system, depending upon the specification that is determined.

According to another broad aspect of the invention, a mass data storage device is presented. The mass data storage device includes a data recording media and a controller to control the recording of data to the data recording media. A cache memory is provided to data to be written to the data recording media, controlled by the controller. The cache memory is configurable, having a selectable write size as determined by the controller. The controller may be configured to accept commands from an external host device to establish the write size of the cache memory.

BRIEF DESCRIPTION OF DRAWINGS

The invention is illustrated in the accompanying drawing.

FIG. 3 is a block diagram of the structure of a typical DVD drive, in which the method or system of the present invention may be embodied.

FIG. 4 is a block diagram of a system that may be used to access both a DVD drive and a hard disk drive, in which the method or system of the present invention may be embodied.

FIG. 5 is a graph of the data size of the writing command vs. busy time of a typical hard disk drive, in which the method or system of the present invention may be embodied.

In the various figures of the drawing, like reference numerals are used to denote like or similar parts.

DETAILED DESCRIPTION

In many mass data storage devices, long busy times are prevalent. The present invention presents a method and apparatus or circuit to control such long busy times. This is accomplished by providing a new communication method between a mass data storage device and its host, the combined system being referred to herein as a dynamic information storage and retrieval system.

Typically, in the construction of dynamic information storage and retrieval systems that include such functions as DVD recorders, hard disk recorders, or some combination thereof, a mass data storage device or drive is generally necessary. To design such system, the communication between the host and the drive should be taken into consideration. However, because a DVD drive is a slow response device, which has a long busy time during communication, the freedom of the structure of the host is restricted. This is primarily due to the fact that in order to accommodate the long busy time, the host needs a large memory as a communication buffer. This makes the system larger and more complex than otherwise would be required if the busy time were not so long.

However, according to a preferred embodiment of the present invention, the host is enabled to vary the size of the cache memory of the data storage system with which it is associated, thereby effectively controlling the overhead and busy times, as described in detail below. This eliminates the need for a large memory or buffer, as heretofore required, simplifying the host design.

Figure 1:
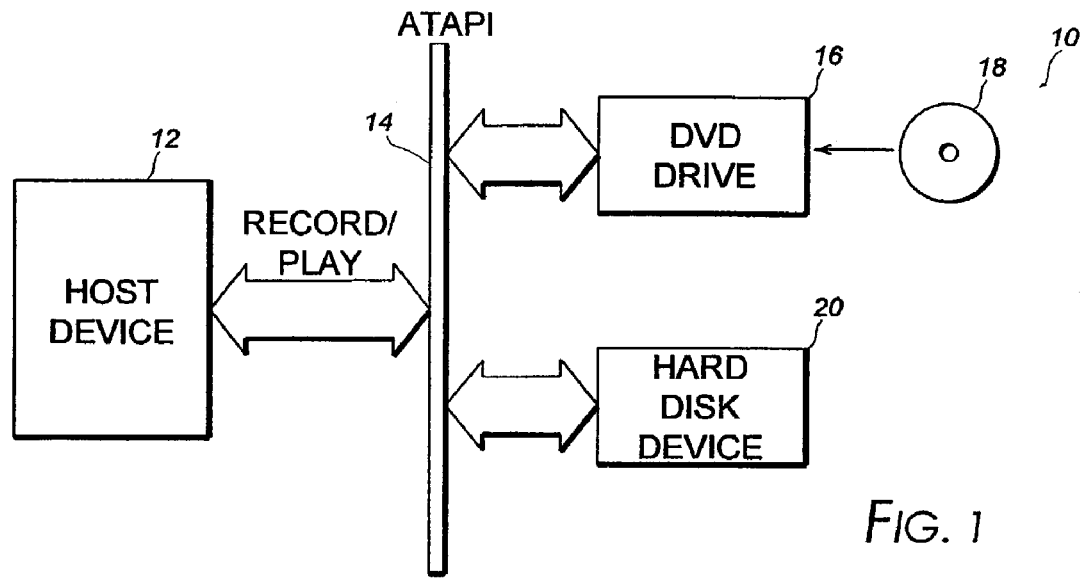
FIG. 1 is a block diagram showing a recording system that can be used with a DVD-recorder, a hard disk-recorder, or the like, in which the method or system of the present invention may be embodied.

A block diagram of a dynamic information storage system 10 that can be used with a DVD-recorder, a hard disk-recorder, or the like, is shown in FIG. 1, in which the method or system of the present invention may be embodied. The dynamic information storage system 10 has a host data system 12 that provides data communication with one or more mass data storage devices through a system bus, an ATAPI bus 14 being shown, for example. Although an ATAPI bus is shown, it should be understood that other bus types may be used, such as, for example, buses of various ATAPI versions, SCSI buses, and so on. The host data system 12 is of the type that has at least a CPU and program that is executed thereby.

As shown, the dynamic information storage system 10 can include a DVD drive 16, which has a capability of writing to and reading from a DVD disk 18. The dynamic information storage system also may have a hard disk drive 20, which also has a capability of being written to and read from. As mentioned above, in the past, the host 12 was generally designed to accommodate the type of mass data storage device, which might be interfaced to the ATAPI bus, which would represent the "worst-case" wait-time that might be anticipated. However, in accordance with a preferred embodiment of the invention, the host 12 can dynamically configure a cache write memory (not shown) that may be associated with the dynamic information storage system 10 to efficiently effect a write operation to whatever type of mass data storage device that may be associated.

Figure 2:
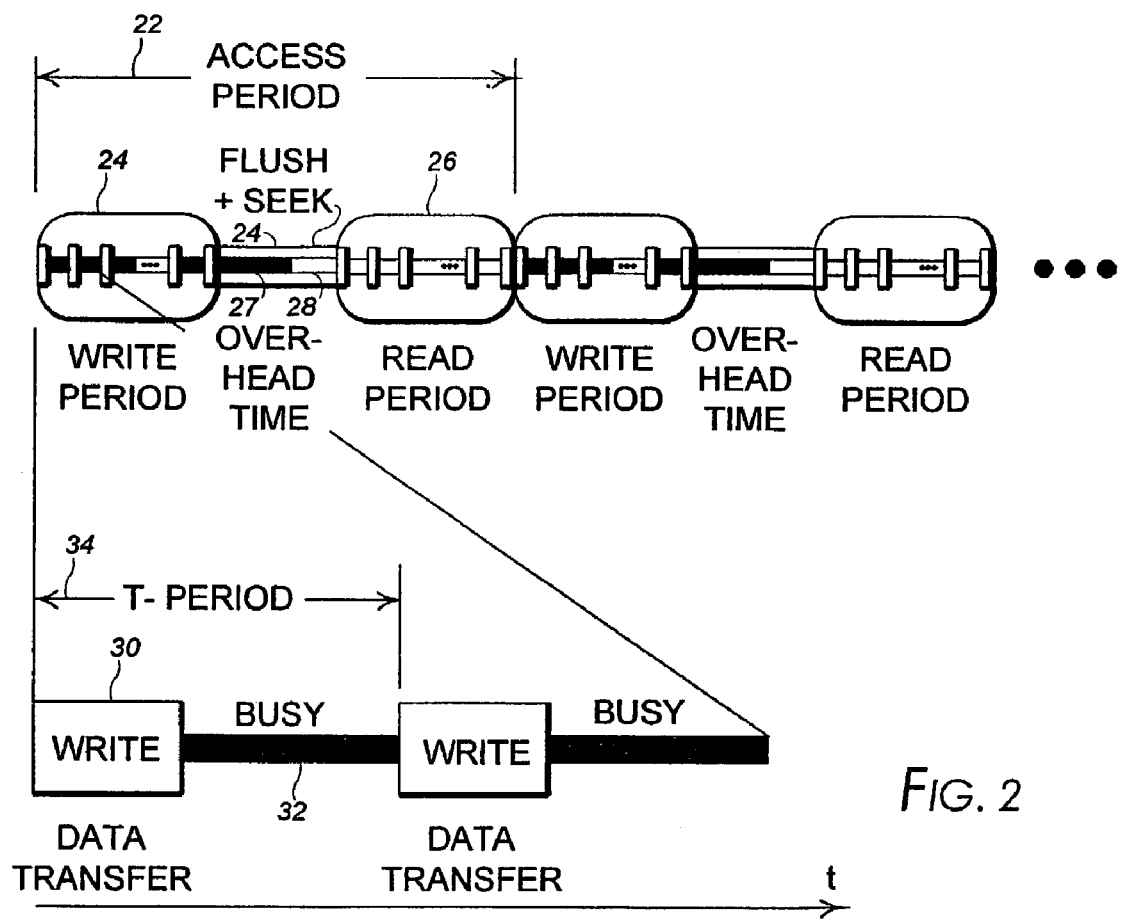
FIG. 2 is a diagram showing a writing and reading sequence of a memory system that may be used in conjunction with the video recording system of FIG. 1.

FIG. 2, to which reference is now additionally made, shows a stylized graph as a function of time showing an example of the various functions of a typical dynamic information storage system of the type shown in FIG. 1, including a typical writing and reading sequence. A typical dynamic information storage system may be, for example, a DVD drive, or the like.

As shown, an access period 22 includes a write period 24, a read period 26, and an overhead time 28 separating the write period 24 and the read period 26. The access period 22 may be repeated a number of times, as shown. The write period 24 may include a host access that recurs, for example, 100 times, to perform processes referred to herein as "write cycles". Similarly, the read period 26 includes a read process executed by the host, for instance, 100 times, to perform processes referred to herein as "read cycles". It should be noted that although the write and read cycles have been illustrated as repeating 100 times, various systems may have other read and write repeating patterns and frequencies, depending upon their particular applications.

An expanded view of a portion of the write period 24 that includes two host write cycles is shown beneath the access period 22. Each of the write cycles includes a data transfer time 30, followed by a busy time 32. The sum of the write time 30 and busy time 32 is defined as the "T-period" 34.

With reference again to the upper portion of the graph, the overhead period 28 includes a time referred to as a "flush" time 27, and a time referred to as a "seek" time 29. The flush time 27 is the time during which data failed to be written to the dynamic information storage system during the write period 24. The seek time is the time required for the heads of the dynamic information storage system to acquire the position at which data is to be read from the dynamic information storage system in a read cycle of a subsequent read period 26.

The overhead time is shown between the writing and reading operations. It is caused by flush and seek processes. The busy time is shown at each writing process, as noted particularly in the bottom of FIG. 2. In order to understand the reason why the flush, seek, and busy processes occur, we need to understand the data flow of a DVD drive.

Thus, another example of a structure of a typical information storage and retrieval system 40 is shown in the context of a DVD drive 41 in FIG. 3, to which reference is now additionally made. The information storage and retrieval system 40 may be used to illustrate the importance of the flush, seek, and busy processes, noted above. A host machine 42, which is connected to a track buffer 46, is interfaced to the DVD drive 40 via an ATAPI bus 44. The host machine 42 may be configured in a manner similar to the host machine 12 described above in conjunction with FIG. 1, including at least a CPU and program means that is executed thereby. Within the DVD drive 40, the ATAPI bus interfaces with a cache memory 48 for write and read processes 50 and 52.

The data to be written to the DVD disk 54 is first loaded into the cache memory 48, and, under the control of the controller 56, is transferred to appropriate writing heads (not shown) to be written to the disk 54. Similarly, data to be read from the disk 54, is detected by the read heads (also not shown), and, under the control of controller 56, is delivered to the cache memory 48. The read the data is then transferred via the ATAPI bus to the host 42 for use.

Thus, in operation, the data flow of a writing process of the DVD drive 40 is as follows. The host 42 sends a write command to the DVD drive 40. The data is transferred from the host 42 to the DVD drive 40. This is referred to herein as the "data transfer process". The data transfer process is illustrated in FIG. 2 above, and denoted by the reference numeral 30. During the data transfer process 30, the data is transferred into the cache memory 48. After the data transfer is finished, all or a portion of the data in the cache is recorded to the DVD disk 54.

During this time, the host may be unable to access the drive 40. This is referred to herein as a "busy process". As indicated above, this data writing cycle may be repeated a number of times, for example, 100 times. After the required number of cycles, the host 42 completes the write command. Within the DVD drive 40, after the completion of the writing process, some of the data to be written may remain within the cache 48. As noted above, during the overhead period 28, any such remaining data is then written to the disk 54 in a process referred to as a "flush process". The time of the flush process is herein referred to as the "flush time", and depends on how much data exists in the cache when the write command is finished. The flush time can be determined from the size of the cache needed during the writing operation.

The seek process includes the time used to seek the starting address of the data to be read. The seek time is also known, being specific to any particular drive. Thus, the overhead time, being the sum of the flush time and seek time, can be determined from the specification of the cache size and the seek time for any particular drive.

As indicated, the busy time depends on the sum of the data transfer time and the "T-period". Both the data transfer time and the "T-period" can be determined from the amount of data to be transferred during the writing command.

In accordance with the present invention, the host device 42 can effectively set the size of the cache memory 48 by sending an appropriate command to the controller 56 of the DVD drive 40. Thus, the construction of the host device 42 as well as the associated dynamic information storage and retrieval can be accomplished in a way that the allocated size of the buffer memory 48 can be varied as needed, depending upon the configuration of the particular drive. This enables the host device 42 to operate in different modes that can be selected by a user. For example, one mode may be a "start/stop DVD recording" mode. Another mode may be a "start HDD accessing mode", and so on.

EXAMPLE 1

As an example of specifying a DVD-RW drive, the following parameters may be assumed:
cache size in writing operation=1.5 MB
disc writing speed=1.38 MB/sec.
seek time=200 msec
ATAPI bus speed=16.6 MB/sec. (PIO transfer mode 4)
data size of writing command=128 KB
from the above specification, the overhead time and the busy time can be calculated as follows:

$$\text{Flush time} = (\text{cache size in writing operation})/(\text{disc writing speed})$$
$$= 1.5 \text{ MB}/(1.38 \text{ MB/sec.})$$
$$= 1086 \text{ msec}$$

$$\text{Busy time} = (T\text{-period}) \text{ minus (data transfer time)}$$
$$= (\text{data size of writing command})/(\text{disk writing speed}) -$$
$$(\text{data size of writing command})/(\text{ATAPI bus speed})$$
$$= 128 \text{ KB}/(1.38 \text{ MB/sec.}) - 128 \text{ KB}/(16.6 \text{ MB/sec.})$$
$$= 85.0 \text{ msec}$$

EXAMPLE 2

As an example of specifying a DVD-RAM drive, the following parameters may be assumed:
cache size in writing operation=1 MB
disc writing speed=2.76 MB/sec.
seek time=80 msec
ATAPI bus speed=16.6 MB/sec. (PIO transfer mode 4)
data size of writing command=256 KB
from the above specification, the overhead time and the busy time can be calculated as follows:

$$\text{Flush time} = (\text{cache size in writing operation})/(\text{disc writing speed})$$
$$= 1 \text{ MB}/(2.76 \text{ MB/sec.})$$
$$= 362 \text{ msec}$$

$$\text{Busy time} = (T\text{-period}) \text{ minus (data transfer time)}$$
$$= (\text{data size of writing command})/(\text{disk writing speed}) -$$
$$(\text{data size of writing command})/(\text{ATAPI bus speed})$$
$$= 256 \text{ KB}/(1.38 \text{ MB/sec.}) - 256 \text{ KB}/(16.6 \text{ MB/sec.})$$
$$= 170 \text{ msec}$$

Referring again to FIG. 1, in the design of a dynamic information storage and retrieval system, or the like, of the type shown that selectively includes both a DVD drive 16 and hard disk drive 20, the characteristics of the drives 16 and 20 are first considered. The ATAPI data bus is used to establish efficient communication. It is noted that the access speed of a hard disk drive 20 is faster than the access speed of the DVD drive 16. Is also noted that the DVD drive 16 has a long busy time. From these considerations, it can be seen that the access schedule to be asserted by the host device 12 should be made to enable sufficient access to the hard disk drive 20 while the DVD drive 16 is in its busy process, as shown in the timing diagram of FIG. 4 to which reference is now additionally made.

As shown in the diagram 60 of FIG. 4, the host 12 delivers data to be recorded to the DVD drive 16 in a recording mode, while, during the same time frame, receives data from the hard disk drive 20 in a playback mode via the ATA bus 14. As shown in the timing diagram 62, each "T-period" 34 includes a data transfer period 30 followed by a busy time 32. Simultaneously, during the busy time 32 data is being read back from the hard disk drive 20. This is accomplished during an initial seek time 64 followed by a plurality of read cycles 66, 68, . . . . It can be seen that the entire read cycle is contained within the period that is defined by the busy period 32 of the DVD drive 16. Moreover, it can be concluded that the busy time of the DVD drive 16 should be the long enough that the host can access the hard disk drive 20 during the time that the DVD drive 16 is in its busy process.

With reference now additionally to FIG. 5, a graph of busy time vs. data size of writing command is shown, illustrating the relationship between data size of the writing command and the busy time. The seek time of the hard disk drive 20 is assumed to be 100 msec, illustrated by the dashed line 69.

In the case of a disk writing speed of 1.38 MB/second, shown by curve 70, the data size of the writing command should be greater than or equal to 256 KB. In the case of a disk writing speed of 2.76 MB/second, shown by curve 72, the data size of the writing command should be greater than or equal to 512 KB. It can be seen that the faster the disk writing speed becomes, the larger the data size of the writing command needs to be.

On the other hand, the data size of the writing command should be less than or equal to the cache size in the writing operation. If the cache size is small and the disk writing speed is fast, accessing both the DVD drive and hard disk drive cannot be realized.

With reference once again to the diagram of FIG. 3, according to a preferred embodiment of the present invention, the host 42 is connected to access the internal controller 56 of the DVD drive 40, as indicated by the dashed line 49. The access that is provided to the host 42 allows the host 42 to control the size of the portion of the internal cache of the storage device 40 that can be used for writing data to the storage device 40, and to control the size of the portion of the cache 48 that can be used as a reading buffer. busy time)

An example of the way that the host device 12 can determine the cache size in a writing operation (i.e., to enable the host device 12 to control the overhead time and An example of the way that the host device 12 can determine the cache size in a writing operation (i.e., to enable the host device 12 to control the overhead time and is as follows.

$$\text{Overhead time} = \text{seek time} + \text{flush time}$$
$$= \text{seek time} + (\text{cache size in writing operation})/(\text{disk writing speed})$$

$$\text{busy time} = (T\text{-period}) - (\text{data transfer time})$$
$$= (\text{data size of writing command})/(\text{disk writing speed}) - (\text{data size of writing command})/(\text{ATAPI bus speed}) < (\text{cache size in writing operation})/(\text{disk writing speed}) - (\text{cache size in writing operation})/(\text{ATAPI bus speed})$$

the seek time, disk writing speed, and ATAPI bus speed are constant values. Also, the data size of the writing command is less than or equal to the cache size in the writing operation. It should be observed that the ability of the host to control the overhead time and the busy time is of particular advantage in designing a DVD system.

With reference again to FIG. 2, which shows the writing and reading characteristics of a drive that includes a DVD drive, the host can make the overhead time short, thereby allowing quick changing of data direction. A large memory in the host to endure the overhead time is not needed. This makes the system smaller and simpler than otherwise would be required. On the other hand, in a system that includes both a DVD drive and a hard disk drive, as illustrated in FIGS. 4 and 5, to which reference is again made, the busy time should be long enough that the host can access a hard disk drive. Even if the disk writing speed is fast, the host can set a large cache size for its writing operation, thereby selecting the large data size of the writing command and busy time. Accessing the hard disk drive while the DVD drive is busy can therefore be realized.

Thus, it can be seen that in the design of an information storage and retrieval system of the type described herein, if the host has a particular overhead time requirement, the size of the cache used for writing can be determined from the following equation:

Cache size=(overhead time−seek time)×disk writing speed.

On the other hand, if the host has a particular busy time requirement, the cache size can be determined from the following equation:

Cache size=busy time×(disk writing speed+ATAPI bus speed)

Of course, if the host has both overhead and busy time requirements, both equations can be used to determine an appropriate cache size.

Moreover, since the overhead time is the sum of the seek and flush times, and the overhead time can be controlled, in accordance with the invention, is it possible to select a cache size that will completely eliminate the flush time, for example, by making the overhead time equal to the seek time.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. A method for operating a data storage system that includes a memory cache, comprising:
   determining a specification of mass data storage devices within the data storage system;
   allocating an amount of the cache memory for writing data to said data storage system, depending upon the specification is determined; and
   allocating a smaller portion of said cache memory if only a DVD device is determined to be present than if both a DVD device and a CD-ROM device are determined to be present.

2. A method for operating a data storage system that includes a memory cache, comprising:
   determining a specification of mass data storage devices within the data storage system;
   allocating an amount of the cache memory for writing data to said data storage system, depending upon the specification is determined; and
   establishing a short busy time in writing to said cache memory if only a DVD device is determined to be present, and establishing a long busy time in writing to said cache memory if both a DVD device and a CD-ROM device are determined to be present.

* * * * *